Jan. 9, 1934.  R. B. MUNDAY  1,943,138
MEANS FOR INDICATING THE OPEN AND CLOSED POSITIONS OF
THE DISCHARGE MEANS OF A LIQUID MEASURE
Filed March 18, 1932   2 Sheets-Sheet 1
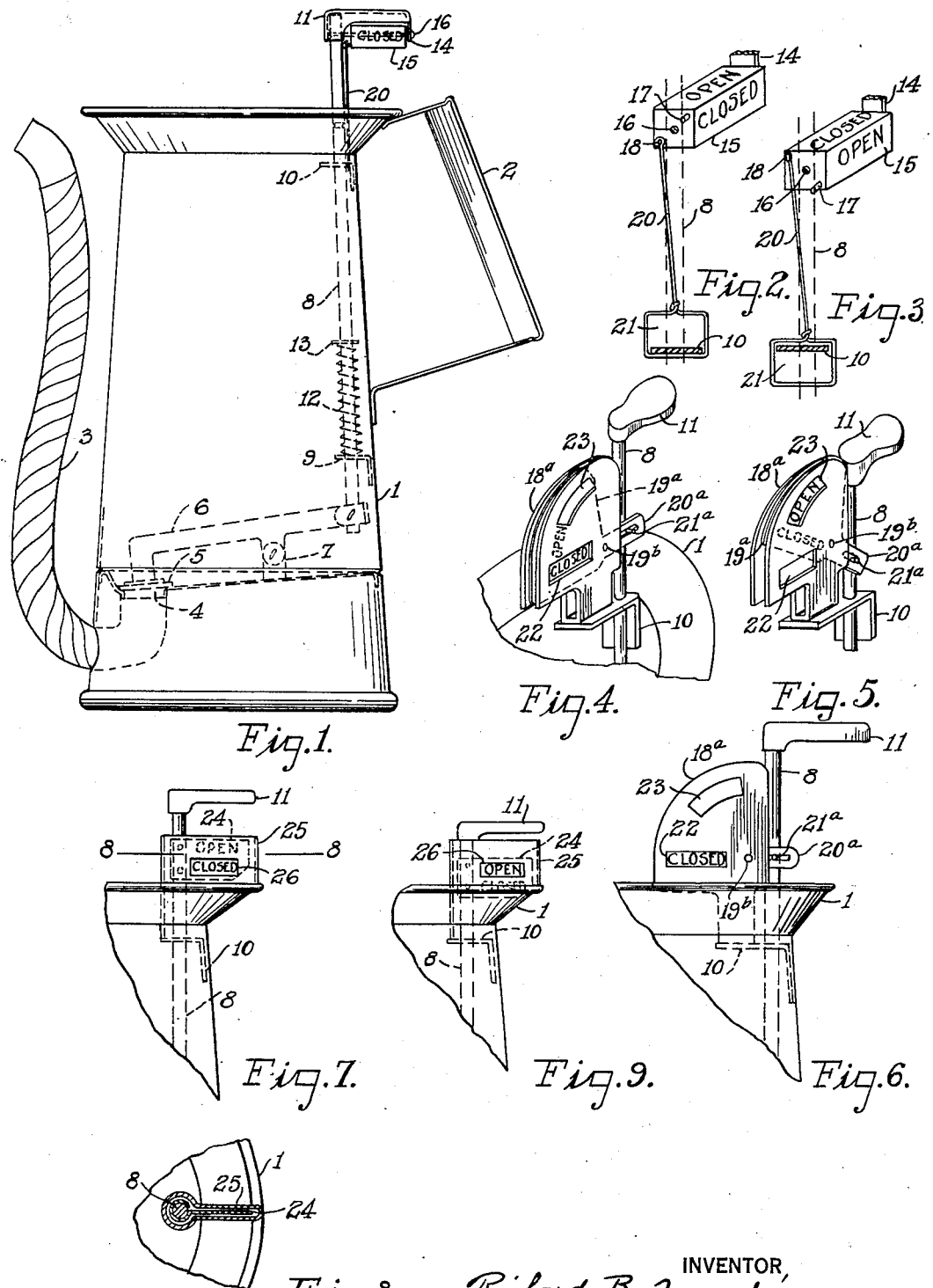
INVENTOR,
Richard B. Munday,
BY
Howard S. Smith
His ATTORNEY

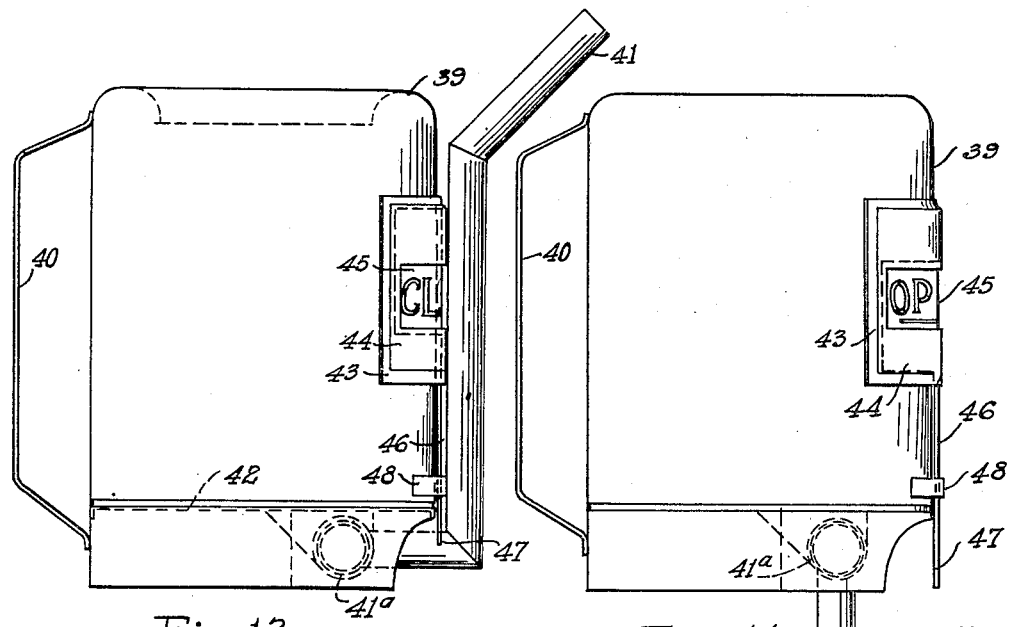
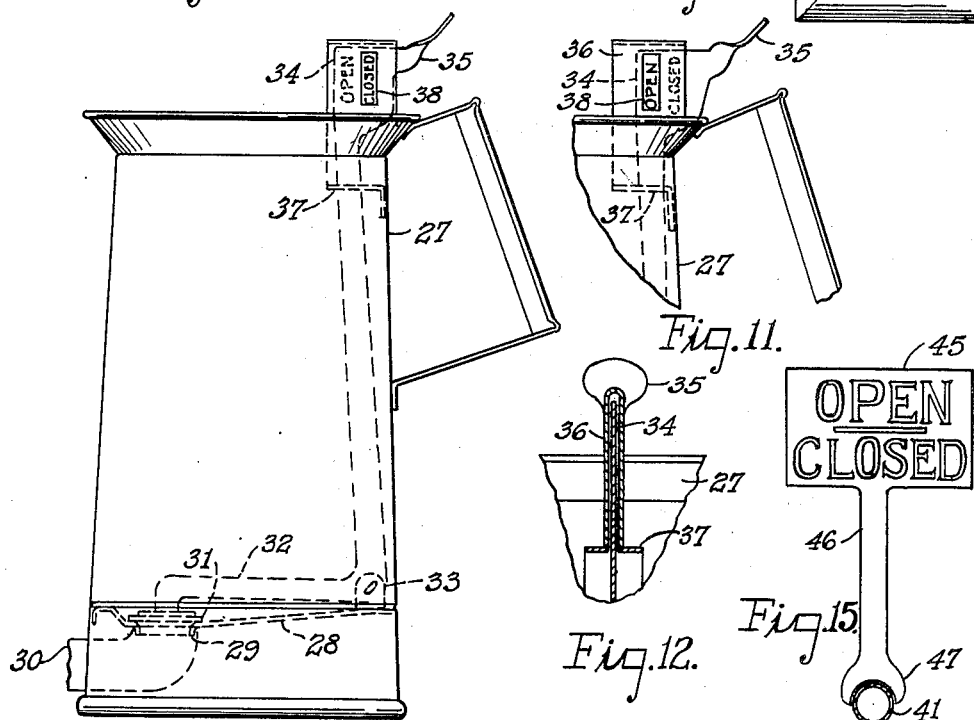

Patented Jan. 9, 1934

1,943,138

UNITED STATES PATENT OFFICE 1,943,138

MEANS FOR INDICATING THE OPEN AND CLOSED POSITIONS OF THE DISCHARGE MEANS OF A LIQUID MEASURE

Richard B. Munday, Oakwood, Ohio, assignor, by mesne assignments, to The Cincinnati Ball Crank Company, Cincinnati, Ohio, a corporation of Ohio Application March 18, 1932. Serial No. 599,737

3 Claims. (Cl. 221—16)

This invention relates to new and useful improvements in means for indicating the position of the discharge means of a liquid measure.

Unless provided with some form of indicating means, there is nothing on a liquid measure to show the customer when the discharge valve is closed by a dishonest attendant before all of the liquid paid for has been dispensed from it. Because of its position in the bottom of the liquid container, the valve is out of the sight of the customer; and where containers employing no valves at all are used, it is quite as easy for an unscrupulous filling station attendant to deprive a customer of a part of the full measure of oil or other liquid to which he is entitled.

It is therefore the principal object of my invention to provide liquid measures of the valve and valveless type, with means clearly visible to the customer, for indicating whether he has received all of the liquid for which he has paid. In those liquid measures where valves are employed, the word "Open" or a like indication will be in full view of the customer until all of the liquid has been discharged therefrom. If the valve should be closed before all of the liquid paid for has been dispensed from the measure, then the word "Closed" or a like indication will flash in the customer's line of vision to disclose the fraud.

Other important and incidental objects will be brought out in the following specification and particularly set forth in the subjoined claims.

In the accompanying drawings illustrating my invention, Figure 1 is a side elevational view of a liquid measure showing a means attached to the top end of the valve-operating push rod to indicate when the valve is open or closed. Figure 2 is a perspective view of said indicator when displaying the word "Closed". Figure 3 is a perspective view of the indicator when it shows the valve to be open.

Figure 4 is a perspective view of another form of indicator for actuation by the valve-operating push rod, showing the word "Closed" in the horizontal slot. Figure 5 is a perspective view of the same indicator with the word, "Open" revealed through the arcuate slot. Figure 6 is a side view of said indicator, showing how it is attached to the top of the container. Figure 7 is a side view of another type of indicator, for operation by the valve-operating push rod, showing the word "Closed" in the horizontal slot of the frame which is attached to the top of the container. Figure 8 is a cross-sectional view taken through the same on the line 8—8 of Figure 7. Figure 9 is a side view of the last mentioned indicator, revealing the word "Open" through the horizontal slot. Figure 10 is a side view of a liquid measure having an indicator operated by the upper end of the valve operating bell crank lever, showing the word "Closed" in the vertical slot of the frame secured to the top of the container. Figure 11 is a side view of the same indicator, with the word "Open" showing through the slot. Figure 12 is a sectional view of said indicator. Figure 13 is a side view of a valveless liquid measure containing an indicator actuated by the liquid discharge spout, disclosing part of the word "Closed" revealed through the slot. Figure 14 is a side view of the same measure, showing part of the word "Open" in the horizontal slot. And Figure 15 is a front view of the indicator target removed from the frame.

Referring now to the drawings for a full description of the various embodiments of my invention, the numeral 1 indicates a liquid measure having a handle 2 and flexible metal dispensing hose 3. (See Figure 1).

The hose 3 is in communication at its inner end with an aperture 4 in the bottom of the container 1, that is effectively closed by a disc valve 5 in the latter. This valve 5 is mounted on one end of a lever arm 6, pivoted at its center on a support 7 mounted in the bottom of the container. The opposite end of the lever is secured to the lower end of a vertical push rod 8 which passes through guides 9 and 10 attached to the side wall of the container 1.

The opposite end of the rod 8, where it projects above the top of the container, has attached thereto a finger piece or button 11 that extends rearwardly toward the handle 2.

Surrounding the rod 8 above the guide 9 is a compression spring 12, that engages a washer 13 secured on the rod 8 above the spring 12. Now, when the finger piece is depressed, the valve 5 will be lifted from the aperture 4 to permit the discharge of the liquid through the hose 3. When the finger piece is released, the valve 5 will be returned to its seat by the spring 12 to effectively stop the flow of liquid.

It is thus seen that the customer must depend entirely upon the attendant to deliver the full measure of liquid, for if the finger piece is released before all of the liquid has drained from the container, the customer will unknowingly be defrauded of a part of his purchase.

In order to prevent such dishonesty and to call the customer's attention to the position of the valve when either "open" or "closed", I have provided the following visual indicator. Pivotally secured below the finger 11, and between a depending apertured lip 14 on the latter, and the rod 8 is an oblong block 15, mounted on a pivot pin 16 and provided on its opposite sides with the words "Open" and "Closed".

Secured in one end of the block 15 and extending forwardly therefrom is a stop pin 17 that will engage the side of the push rod 8.

Secured in the opposite corner of the block 15 is a forwardly projecting shorter pin 18 to which the upper end of an actuating link 20 is attached. The lower end of the link 20 is formed to provide a rectangular frame 21 that receives the top guide 10.

Now, as shown at Figure 2, when the finger piece 11 is released, the block 15 will disclose the word "Closed" on its opposite vertical faces. When, as shown in Figure 3, the finger piece is depressed, the top of the rectangular frame 21 formed on the lower end of the link 20 will engage the guide 10 and cause the block 15 to make a 90° revolution to disclose the word "Open" on its opposite vertical faces, the stop pin 17 engaging the side of the rod 8 to arrest a further movement of the block. (See Figure 3). It is thus seen that with reasonable diligence on the part of the customer, he can readily ascertain whether the valve is open or closed to inform him whether he has received the full measure of liquid for which he has paid.

In Figures 4, 5 and 6, I have shown another type of indicator actuated by the rod 8 and comprising a quadrant shaped target enclosure 18ᵃ supported upon the top guide 10. Between the parallel sides of the enclosure 18ᵃ is a target 19ᵃ mounted on a pivot 19ᵇ, and having in a rearwardly extending arm 20ᵃ an elongated slot adapted to receive a pin 21ᵃ secured to the rod 8.

The sides of the target enclosure 18ᵃ are provided with oppositely disposed horizontal apertures 22 to disclose the word "Closed" on the target 19ᵃ when the finger piece is released and the valve 5 closed. When the finger piece is depressed to open the valve, the pin 21ᵃ will rotate the target about its pivot 19ᵇ and bring the word "Open" printed upon the target into registry with oppositely disposed arcuate slots 23, in the sides of the enclosure 18ᵃ.

By this indicator means, the customer can readily observe if the valve is closed too soon to permit the delivery of the full liquid measure.

In Figures 7, 8 and 9 I have disclosed a simpler visual indicator attached to a measure as shown at Figure 1. In this type of indicator I have rigidly attached to the rod 8 a target 24 having printed on each side thereof the words "Open" and "Closed" and positioned one word above the other.

Surrounding the target is an oblong enclosure 25 supported on the guide 10 and provided adjacent the lower end of the target with oppositely disposed horizontal openings 26. When the valve 5 is closed, the words "Closed" will be in registry with the openings 26 and when the finger piece 11 is depressed to open the valve the rod 8 will lower the target 24 until the words "Open" are in registry with the openings 26 and are visible to the customer.

By this simple structure and reasonable caution on the part of the customer, he is assured a full measure of the liquid purchased.

As shown at Figures 10, 11 and 12, I have disclosed a different type of valve actuating mechanism. The container 27 has its bottom 28 provided with an aperture 29. Fitted to this aperture below the bottom 28 is a flexible metal spout 30 through which the liquid is discharged. The aperture 29 is adapted to be closed by a valve 31 secured at the lower outer end of a bell crank lever 32 that is pivoted at its center to a support 33 secured in the bottom of the container.

The opposite end of the bell crank projects above the rim of the container 27 where it is formed with an indicator 34 and finger piece 35.

Surrounding the indicator 34 is an inverted U shaped shield 36 supported upon a slotted guide 37 for the lever 32 and positioned below the indicator 34 within the container.

The shield 36 has oppositely disposed vertical openings 38 that register with the word "Closed" printed on the indicator when the valve is closed. (See Figure 10.)

Now, when the finger piece 35 is drawn rearwardly to open the valve, the indicator will move with it to bring the word "Open" into registry with the openings 38. (See Figure 11.)

As long as the valve is held open by the attendant, the word "Open" will be displayed to the customer; and if the valve is closed prematurely to defraud the customer, the word "Closed" will immediately appear as a warning.

In Figures 13, 14 and 15 another type of liquid measure is shown. This comprises a container 39 provided with a handle 40 and a swinging spout 41 hinged to a depending discharge tube 41ᵃ fitted to the under side of a false bottom 42 of the container. Secured to the outer face of the container 39 behind the swinging spout 41 is an apertured guide 43, having a raised center portion 44 within which a vertically sliding indicator 45 is positioned.

The indicator 45 is formed to the contour of the container and has a lower depending arm 46 with a yoked end 47 that receives the spout 41. (See Figure 15.) Between the spout and the guide 43 the arm 46 passes under a strap 48 secured to the container 39.

Printed on the outer face of the indicator are the words "Closed" and "Open" so that, when the spout is in its upward position as shown in Figure 13, the word "Closed" will be disclosed through the aperture in the guide 43; and when the spout is swung down to discharge its contents as shown at Figure 14, the indicator 45 will drop and thus disclose the word "Open" through the aperture in the guide.

Having described my invention, I claim:

1. A liquid measure comprising a container, an outlet for the latter, a discharge spout connected to said outlet, a valve for said outlet, a lever arm for opening and closing said valve, a vertical push rod for operating said lever arm, a block pivoted to said rod, one face of said block displaying the word "Open" and another the word "Closed", a fixed element secured to said container, and means connected between the fixed element and the block for turning the block bringing the side bearing the "Open" designation to appropriate display position when the push rod is depressed to open the valve, and for bringing the side bearing the "Closed" designation to appropriate display position when the push rod is elevated to close said valve.

2. A liquid measure comprising a container, an outlet for the latter, a discharge spout connected to said outlet, a valve for said outlet, a lever arm for opening and closing said valve, a vertical push rod for operating said lever arm, a horizontal finger piece secured to the top portion of said push rod, said finger piece having a downwardly depending flange, a block pivoted between said rod and the flange on the finger piece, a fixed member on the container below said block, a link pivotally connected at one end to one face of said block, the link terminating at its lower end in a frame portion fitted over the fixed member to engage the latter at its top and bottom portion, and a stop pin on the aforesaid face of said block for engagement with said push rod, said pin being diagonally opposite the point of connection of the link to the block, the latter displaying the word "Closed" on two opposite sides, and the word "Open" on its remaining two sides.

3. A liquid measure, comprising, a container having an outlet at its base, a flexible discharge spout connected to said outlet, a valve for controlling said outlet, lever means for actuating said valve including an actuator rod extending above the top of the container and a valve position indicator mounted in relation to said rod and operatively connected therewith for indicating either the open or closed positions of said valve.

RICHARD B. MUNDAY.